United States Patent [19]
Kusaka et al.

[11] Patent Number: 5,251,930
[45] Date of Patent: Oct. 12, 1993

[54] SUSPENSION SYSTEM WITH TRANSVERSE LEAF SPRING

[75] Inventors: Kaoru Kusaka; Yoshinobu Tada; Hajime Kajiwara, all of Tochigi, Japan

[73] Assignee: Honda Giken Kogyo Kabushiki Kaisha, Tokyo, Japan

[21] Appl. No.: 821,923

[22] Filed: Jan. 16, 1992

[30] Foreign Application Priority Data

Jan. 17, 1991 [JP] Japan ................................ 3-16990

[51] Int. Cl.$^5$ .............................................. B60G 3/00
[52] U.S. Cl. ...................................... 280/719; 280/720; 267/36.1; 267/260
[58] Field of Search ...................... 280/718, 719, 720; 267/36.1, 260

[56] References Cited

U.S. PATENT DOCUMENTS

| | | | |
|---|---|---|---|
| 2,697,613 | 12/1954 | Giacosa ............................. | 280/719 |
| 3,917,306 | 11/1975 | Madler et al. ..................... | 280/719 |
| 4,725,074 | 2/1988 | Stevens ............................. | 280/719 |
| 4,887,841 | 12/1989 | Cowburn et al. .................. | 280/719 |
| 4,997,202 | 3/1991 | Kitagawa et al. ................. | 280/719 |
| 5,058,918 | 10/1991 | Nakaya et al. .................... | 280/718 |

FOREIGN PATENT DOCUMENTS 53-29291 7/1978 Japan.
2-133212 5/1990 Japan.

*Primary Examiner*—Kenneth R. Rice
*Attorney, Agent, or Firm*—Irving M. Weiner; Joseph P. Carrier; Pamela S. Burt

[57] ABSTRACT

A suspension system on a motor vehicle includes a transverse leaf spring interconnecting knuckles on which road wheels are rotatably supported. The suspension system includes a pair of knuckle members on which the road wheels are rotatably mounted, an elongate leaf spring which is vertically resilient and extends transversely with respect to the vehicle body, the leaf spring having opposite ends coupled to the knuckle members, respectively, a support member supporting the leaf spring at two supporting points thereon which are spaced from each other transversely with respect to the vehicle body, for allowing the leaf spring to move transversely but limiting the leaf spring against vertical movement with respect to the vehicle body, and a transverse movement limiting mechanism for allowing the leaf spring to move vertically but limiting the leaf spring against transverse movement with respect to the vehicle body. The transverse movement limiting mechanism comprises a link mechanism which couples a portion of the leaf spring between the two supporting points to the vehicle body.

12 Claims, 7 Drawing Sheets

FIG. 5
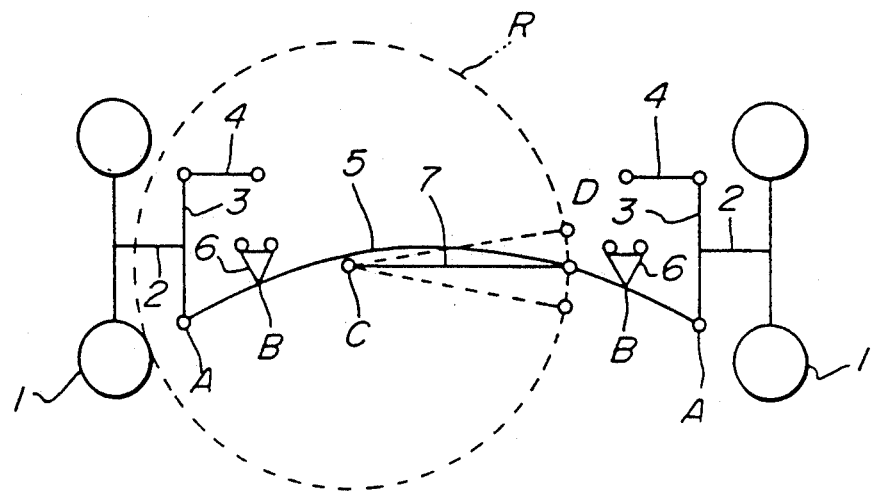
FIG. 6a
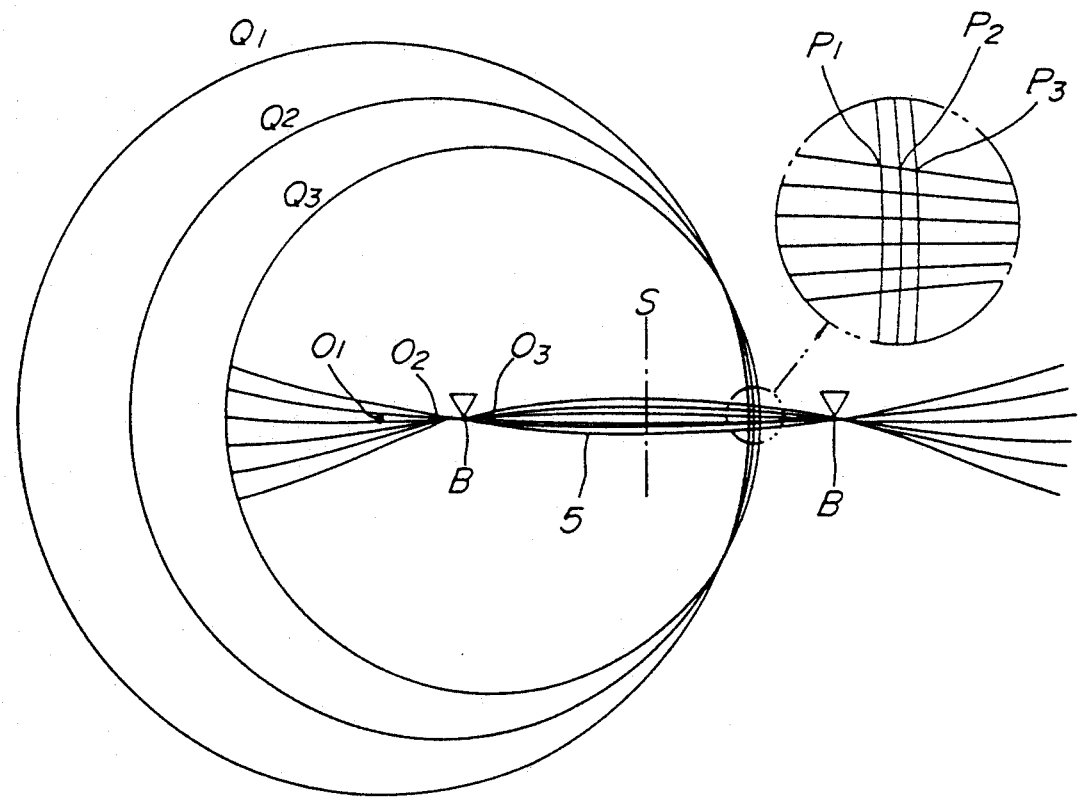
FIG. 6b

SUSPENSION SYSTEM WITH TRANSVERSE LEAF SPRING

BACKGROUND OF THE INVENTION

1. Field of the Invention

The present invention relates to a motor vehicle suspension system comprising an elongate leaf spring which is vertically resilient and extends transversely of a motor vehicle, the leaf spring interconnecting knuckle members of the motor vehicle.

2. Description of the Relevant Art

One known motor vehicle suspension system comprises an elongate, vertically resilient leaf spring that extends in the transverse direction of a motor vehicle. The leaf spring has opposite ends connected to respective laterally spaced knuckle members coupled to axles, respectively, on which road wheels are mounted. It is desirable that the leaf spring be supported in a manner to allow its vertical swinging movement in response to vibration of the road wheels and also to maintain its transverse central axis with respect to the body of the motor vehicle.

Japanese Utility Model Publication No. 53-29291 discloses a suspension system with a transverse leaf spring interconnecting laterally spaced knuckles, the leaf spring being supported on a vehicle body at two laterally spaced points for limited lateral and vertical movement with respect to the vehicle body. Because the lateral movement of the leaf spring is limited, the suspension system has a comparatively high degree of lateral rigidity. However, vertical swinging movement of the leaf spring is also limited since the lateral movement of the leaf spring is limited at the two supporting points. As a result, the function of the transverse leaf spring as a stabilizer is low, making riding comfort poor.

Japanese Laid-Open Patent Publication No. 2-133212 also shows a suspension system with a transverse leaf spring interconnecting laterally spaced knuckles. The leaf spring is supported such that it is allowed to move transversely with respect to a vehicle body, but limited against vertical movement, at two laterally spaced points. The suspension system also includes a mechanism located at its center between the two supporting points for allowing the leaf spring to move vertically, but limiting transverse movement of the leaf spring.

Inasmuch as the vertical movement of the leaf spring is limited at the two laterally spaced points and the transverse movement of the spring spring is limited at its center, the suspension system maintains its transverse rigidity, and the leaf spring is permitted to perform a stabilizer function.

The mechanism for limiting transverse movement of the leaf spring, disclosed in Japanese Laid-Open Patent Publication No. 2-133212, comprises a guide roller disposed on the center of the leaf spring and held in rolling engagement with a guide rail vertically supported on the vehicle body. Since the guide roller and the guide rail are held in contact with each other at all times, they wear due to friction therebetween. Therefore, the mechanism remains to be improved for greater durability.

SUMMARY OF THE INVENTION

It is an object of the present invention to provide a suspension system having a transverse leaf spring that interconnects laterally spaced knuckles, the suspension system having independent functions to limit vertical and transverse movement of the leaf spring for maintained transverse rigidity and better riding comfort.

Another object of the present invention is to provide a suspension system having a transverse leaf spring and a mechanism for limiting transverse movement of the leaf spring, the mechanism having no sliding components for better durability.

According to the present invention, there is provided a suspension system on a motor vehicle having road wheels rotatably supported on a vehicle body, comprising a pair of knuckle members on which the road wheels are rotatably mounted, an elongate leaf spring which is vertically resilient and extends transversely with respect to the vehicle body, the leaf spring having opposite ends coupled to the knuckle members, respectively, a support member supporting the leaf spring at two supporting points thereon which are spaced from each other transversely with respect to the vehicle body, for allowing the leaf spring to move transversely but limiting the leaf spring against vertical movement with respect to the vehicle body, and a transverse movement limiting mechanism for allowing the leaf spring to move vertically but limiting the leaf spring against transverse movement with respect to the vehicle body, the transverse movement limiting mechanism comprising a link mechanism which couples a portion of the leaf spring between the two supporting points to the vehicle body.

The link mechanism may comprise a lateral link having an end pivotally coupled to the portion of the leaf spring between the two supporting points and an opposite end pivotally coupled to the vehicle body, or a Watt's linkage mechanism which comprises an intermediate link having a substantially central portion pivotally coupled to a substantially central portion of the leaf spring between the supporting points, and a pair of links having ends pivotally coupled to opposite ends, respectively, of the intermediate link and opposite ends pivotally coupled to the vehicle body.

In the case where the lateral link is employed, the opposite end of the lateral link is pivotally coupled to the vehicle body at a pivot point which is positioned near the center of an imaginary circle which is followed by a pivot point where the end of the lateral link is pivotally coupled to the portion of the leaf spring, when the leaf spring moves vertically.

In the case where the Watt's linkage mechanism is employed, a substantially central portion of the leaf spring is allowed to move only vertically along a substantially straight line, and any transverse movement of the leaf spring is limited to almost zero.

Whichever link mechanism is employed, the pivot point where the link mechanism is pivotally coupled to the vehicle body may be positioned near at least one of the supporting points, and the support member may be shared by the leaf spring and the link mechanism for pivotal support.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 5 is a schematic diagram showing the manner in which the lateral links operate;

FIG. 6a is a diagram showing the manner in which points where the lateral links are pivotally connected are selected;

FIG. 6b is an enlarged view of a relevant portion of FIG. 6a;

DETAILED DESCRIPTION OF THE PREFERRED EMBODIMENTS

A suspension system according to a first embodiment of the present invention will be described below with reference to FIGS. 1 through 6b.

Figure 1:
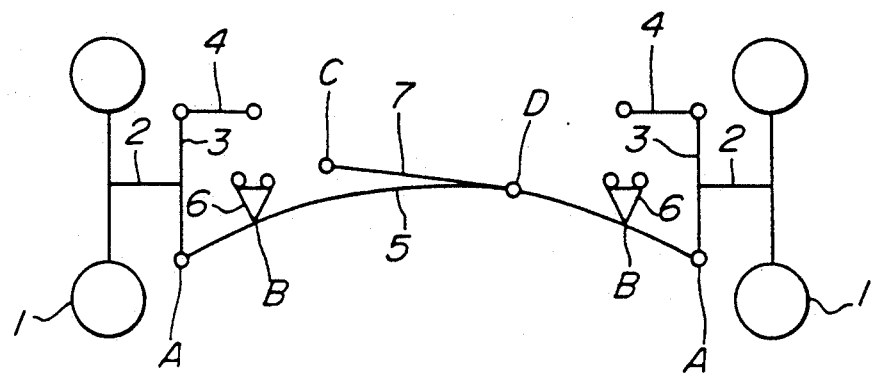
FIG. 1 is a schematic diagram of a suspension system with a transverse leaf spring according to a first embodiment of the present invention.

As shown in FIG. 1, two laterally spaced road wheels 1 of a motor vehicle are rotatably supported on respective axles 2 that are fixed respectively to knuckle members 3. The knuckle members 3 have upper ends connected to a vehicle body of the motor vehicle by respective upper arms 4. The lower ends of the knuckle members 3 are pivotally connected at pivot points A to respective opposite ends of an elongate leaf spring 5 that extends in the transverse direction of the motor vehicle. Therefore, the knuckle members 3 are connected to each other by the leaf spring 5. The illustrated suspension system is thus in the form of a double wishbone suspension with the leaf spring 5 serving as lower arms.

The leaf spring 5 is made of fiber-reinforced plastic (FRP) and has an upwardly convex arcuate shape so that it is vertically resilient.

Although not shown, shock absorbers are connected between the knuckle members 3 and the vehicle body.

The lower ends of the knuckle members 3 may be connected to the vehicle body by lower arms, with the leaf spring 5 connected between the lower arms. Alternatively, the leaf spring 5 may be connected between the upper arms 4, or the upper arms 4 may be dispensed with and the upper ends of the knuckle members 3 may be connected directly by the leaf spring 5. The coil springs of any of various other suspension systems such as a strut suspension may be replaced with the leaf spring 5.

The leaf spring 5 is supported at two supporting points B by mount members 6 that are spaced from each other in the transverse direction of the vehicle body, such that the leaf spring 5 can slide in the transverse direction of the vehicle body, but cannot move in the vertical direction. Thus, the mount members 6 allow the leaf spring 5 to move transversely with respect to the vehicle body and limit the leaf spring 5 against vertical movement, at each of the supporting points B. The leaf spring 5 is therefore vertically swingable to permit itself to be resilient in the vertical direction.

The leaf spring 5 is also allowed by a link mechanism to move vertically with respect to the vehicle body. The link mechanism also limits the leaf spring 5 against transverse movement.

Figure 2:
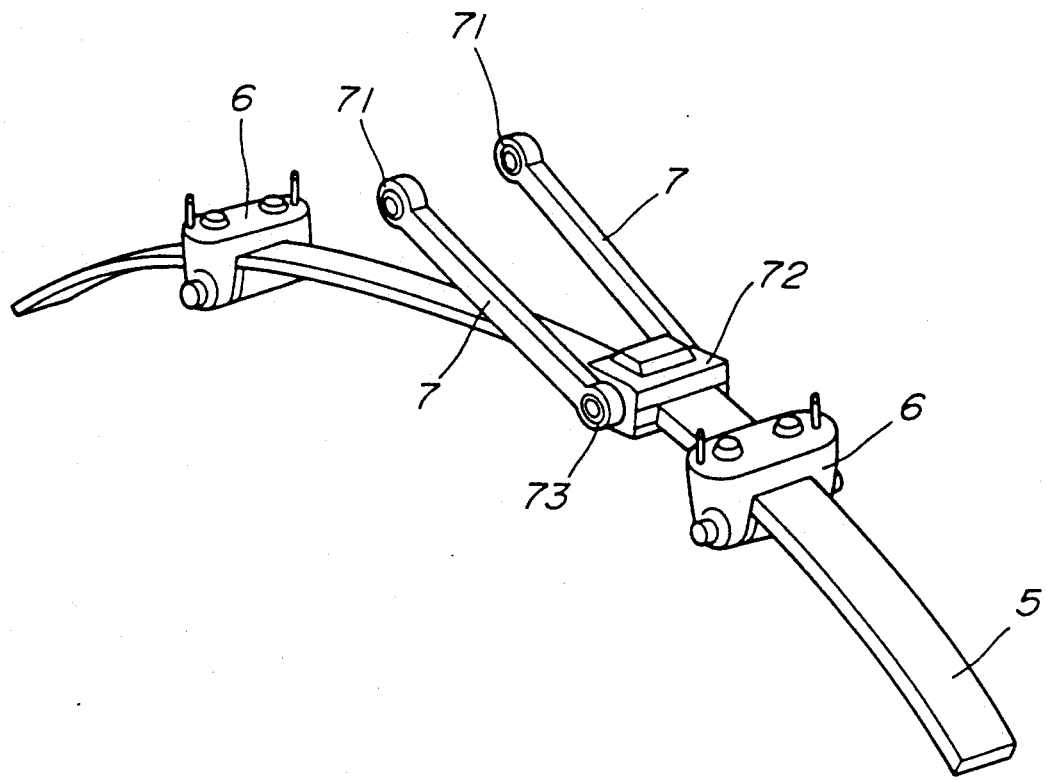
FIG. 2 is a perspective view of a structure for supporting the leaf spring of the suspension system shown in FIG. 1.

The link mechanism comprises a pair of lateral links 7 each having one end pivotally connected to the vehicle body at a pivot point C and the other end to the leaf spring 5 at a pivot point D that is located between the supporting points B. As shown in FIG. 2, the lateral links are spaced from each other in the longitudinal direction of the vehicle body.

Figure 3:
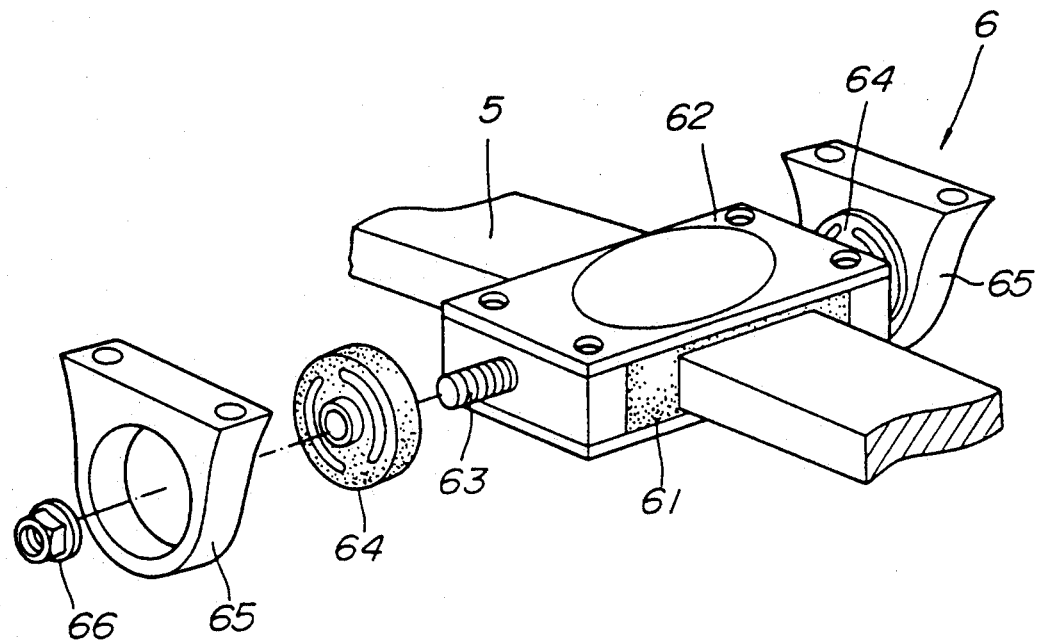
FIG. 3 is a fragmentary exploded perspective view of a support structure for limiting vertical movement of the leaf spring.

As shown in FIG. 3, each of the mount members 6 comprises a rubber mount 61 holding the leaf spring 5 extending therethrough, a case 62 housing the rubber mount 61 therein, two externally threaded shafts 63 projecting respectively from front and rear ends of the case 62, two rubber bushings 64 threaded over the externally threaded shafts 63, respectively, two brackets 65 supporting the respective rubber bushings 64 and attached to the vehicle body, and two nuts 66 threaded over the respective externally threaded shafts 63.

Figure 4:
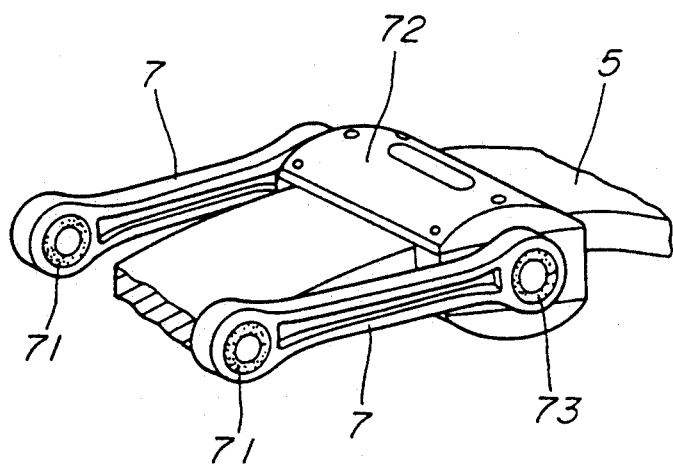
FIG. 4 is a fragmentary perspective view of a structure by which the leaf spring is coupled to lateral links.

As shown in FIG. 4, each of the lateral links 7 has one end swingably attached to the vehicle body through a rubber bushing 71. The other end of each lateral link 7 is swingably coupled through a rubber bushing 73 to one of the front and rear ends of a case 72 that holds the leaf spring 5 extending therethrough.

As shown in FIG. 5, the pivot point D at which the lateral links 7 are pivotally coupled to the leaf spring 5 can move along an imaginary circle about the pivot point C where the lateral links 7 are pivotally coupled to the vehicle body. Therefore, the lateral links 7 serve as a transverse movement limiting mechanism for limiting transverse movement of the leaf spring 5 while allowing the leaf spring 5 to move vertically.

The leaf spring 5 is limited against vertical movement at the two supporting points B by the mount members 6, and also against transverse movement at the pivot point D by the lateral links. Therefore, the mount members and the lateral links 7 independently perform a function to limit vertical movement of the leaf spring 5 and a function to limit transverse movement of the leaf spring 5, respectively.

Since the transverse movement of the leaf spring is limited, the suspension system maintains its transverse rigidity, and since the vertical movement of the leaf spring 5 is limited, the suspension system is allowed to function as a stabilizer for better riding comfort.

The mechanism, composed of the lateral links 7, for limiting transverse movement of the leaf spring 5 is free from any components, such as a roller and a rail, that are held in rolling contact with each other. Therefore, this mechanism is not subject to wear and has relatively large durability. The mechanism is made up of a relatively small number of parts, and is of a relatively simple structure and can be attached with ease. Because there are two lateral links 7 respectively in front of and behind the leaf spring 5, they are effective to prevent the intermediate portion of the leaf spring 5 from being twisted.

The manner in which the pivot points C, D are selected will be described below with reference to FIG. 6.

As shown in FIGS. 6a and 6b with the leaf spring 5 limited against vertical movement at the two supporting points B, points $P_1$, $P_2$, $P_3$ on the leaf spring 5 trace respective paths along imaginary circles $Q_1$, $Q_2$, $Q_3$ as the leaf spring 5 flexes due to vertical movement of the road wheels. The imaginary circles $Q_1$, $Q_2$, $Q_3$ have respective centers $O_1$, $O_2$, $O_3$ that are positioned on a straight line interconnecting the supporting points B.

Therefore, if the point point D is selected to be the point $P_1$, $P_2$, or $P_3$ on the leaf spring 5, and if the pivot point C is selected to be the center $O_1$, $O_2$, or $O_3$ of the imaginary circle $Q_1$, $Q_2$, or $Q_3$, then the path followed by the point $P_1$, $P_2$, or $P_3$ upon vertical flexing movement of the leaf spring 5 is held in substantial alignment with a path R traced by the pivot point D of the lateral links 7 about the pivot point C where the lateral links 7 are pivotally coupled to the vehicle body. Consequently, only the transverse movement of the leaf spring 5 can be limited while the leaf spring it is allowed to move vertically.

At this time, the pivot point C is positioned in the vicinity of the straight line that interconnects the supporting points B on the leaf spring 5.

With the pivot points C, D thus selected, the leaf spring 5 is limited against transverse movement, but allowed to move vertically, at the pivot point D.

Figure 7:
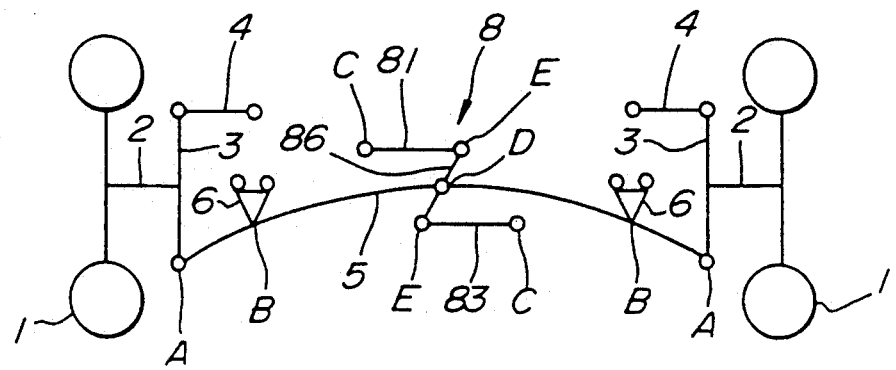
FIG. 7 is a schematic diagram of a suspension system with a transverse leaf spring according to a second embodiment of the present invention.

FIG. 7 shows a suspension system with a transverse leaf spring according to a second embodiment of the present invention.

In the second embodiment, as shown in FIG. 7, the leaf spring 5 is allowed to move vertically, but limited against transverse movement, by a Watt's linkage mechanism 8. The Watt's linkage mechanism of vertically spaced upper and lower links 81, 83, and an intermediate link 86 operatively interconnecting the upper and lower links 81, 83.

The upper and lower links 81, 83 have ends pivotally coupled to the vehicle body at pivot points C and other ends to respective upper and lower ends of the intermediate links 86 at pivot points E. The intermediate link 86 has a central portion pivotally coupled to the center of the leaf spring 5 at a pivot point D.

The distances CE between the pivot points C, E of the upper and lower links 81, 83 are equal to each other, and the distances ED between the pivot points E, D of the intermediate link 86 are equal to each other. These dimensional features allow the pivot point D to follow an approximately straight vertical line when the links 81, 83 are angularly moved about the pivot points C. Therefore, the leaf spring 5 is allowed to move vertically, but is limited against transverse movement without any sliding or rolling components which would otherwise be provided on the leaf spring 5.

As seen from FIGS. 6a and 6b, while the leaf spring 5 is prevented from moving vertically at the two supporting points B, the center of the leaf spring 5 follows a straight vertical line S when the leaf spring 5 flexes upon vertical movement of the road wheels. Therefore, if the pivot point D of the intermediate link 86 is selected to be on the center of the leaf spring 5, the leaf spring 5 is allowed to move along a vertical line, but any transverse movement of the leaf spring 5 is reduced to almost zero.

Figure 8:
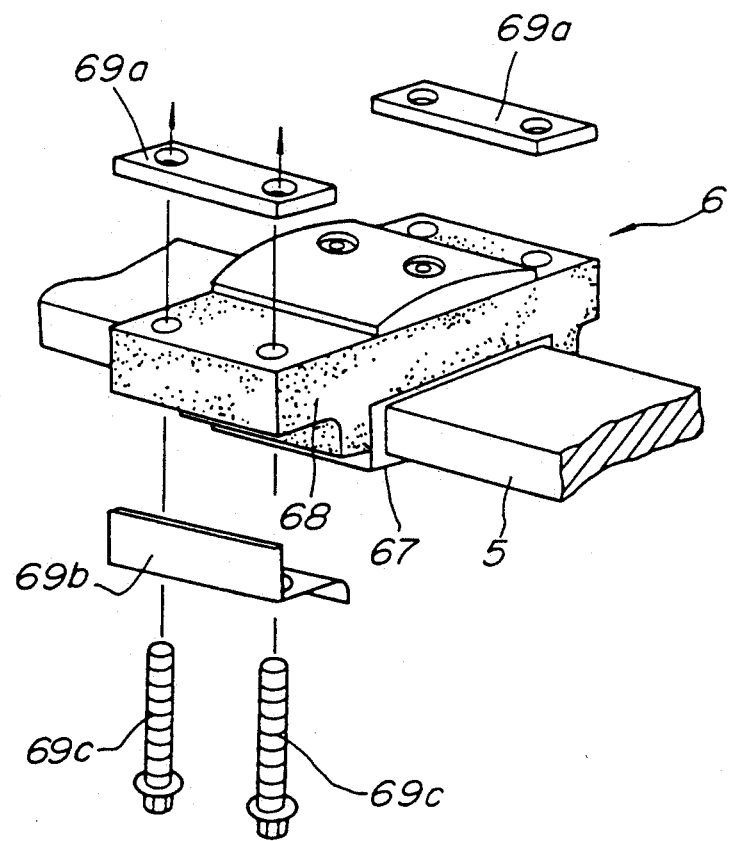
FIG. 8 is a fragmentary perspective view of a structure for supporting the leaf spring of the suspension system shown in FIG. 7.

The mount members 6 allow the leaf spring 5 to move transversely but prevent the same from moving vertically at the supporting points B. As shown in FIG. 8, each of the mount members 6 comprises a case 67 holding the leaf spring 5 extending therethrough, a rubber mount 68 joined to the case 67, two pairs of brackets 69a, 69b vertically sandwiching front and rear portions of the rubber mount 68, and bolts 69c fastening the brackets 69a, 69b together.

Figure 9:
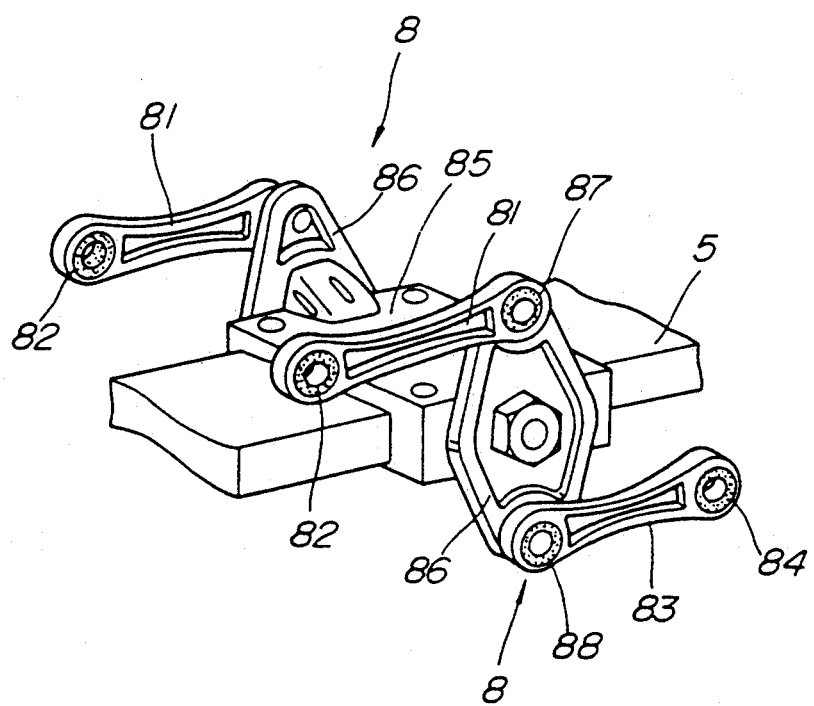
FIG. 9 is a fragmentary perspective view of a structure by which a Watt's linkage mechanism is coupled to the leaf spring.

As shown in FIG. 9, there are actually two Watt's linkage mechanisms 8 positioned respectively in front of and behind the leaf spring 5. The upper and lower links 81, 83 have ends pivotally coupled to the vehicle body through respective rubber bushings 82, 84. The central portions of the intermediate links 86 are angularly movably connected to the center of the leaf spring 5. The other ends of the upper and lower links 81, 83 are pivotally coupled to the upper and lower ends of the intermediate links 86 through respective rubber bushings 87, 88.

The Watt's linkage mechanisms 8 permit the center of the leaf spring 5 to move only on a vertical line through the pivot point D, and limit any transverse movement of the leaf spring 5 to almost zero. Consequently, the suspension system maintains its transverse rigidity, and is allowed to perform a stabilizer function.

A suspension system according to a third embodiment of the present invention will be described below with reference to FIGS. 10 through 12.

Figure 10:
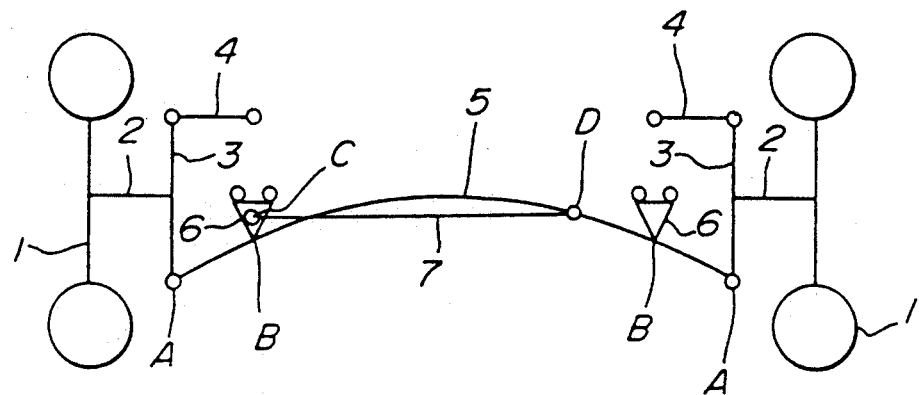
FIG. 10 is a schematic diagram of a suspension system with a transverse leaf spring according to a third embodiment of the present invention.
Figure 11:
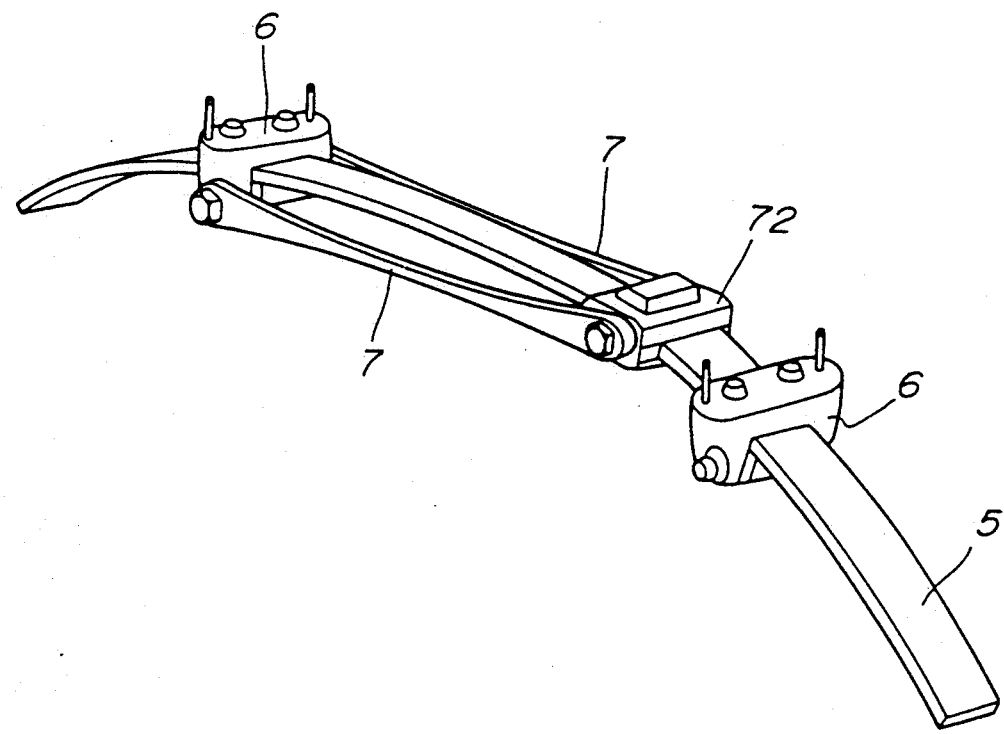
FIG. 11 is a perspective view of a structure for supporting the leaf spring of the suspension system shown in FIG. 10.
Figure 12:
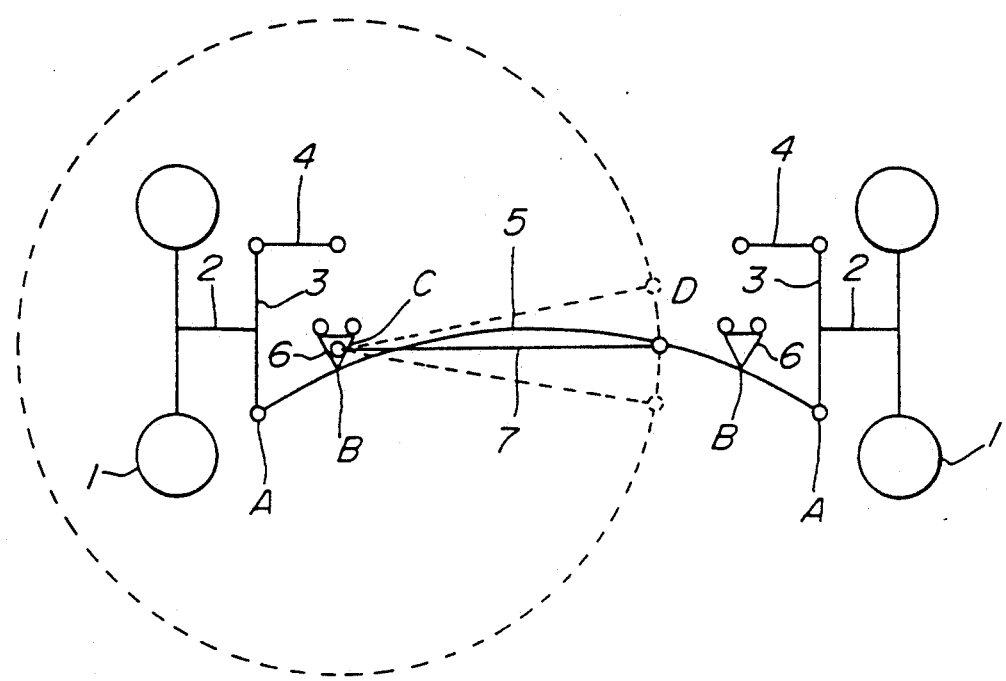
FIG. 12 is a schematic diagram showing the manner in which the lateral links operate.

As shown in FIGS. 10 and 11, a pair of front and rear lateral links 7, which are similar to those of the first embodiment, is pivotally coupled to the leaf spring 5. The lateral links 7 have ends pivotally coupled to the vehicle body at a pivot point C that is positioned in the vicinity of one of the supporting points B where the leaf spring 5 is connected to the vehicle body. The ends of the lateral links 7 are also pivotally coupled to the mount member 6 at said one of the supporting points B. Therefore, the mount member 6 is shared by the leaf spring 5 and the lateral links 7.

Since the lateral links 7 are pivotally coupled to one of the mount members 6 of the leaf spring 5, the leaf spring 5 and the lateral links 7 can simultaneously be attached to the vehicle body simply by installing the mount member 6 and the lateral links 7 on the leaf spring 5 and then attaching the mount member 6 to the vehicle body. Therefore, the process of attaching the leaf spring 7 and the lateral links 7 to the vehicle body is simplified. FIG. 12 shows the manner in which the lateral links 7 move during operation of the suspension system according to the third embodiment.

Figure 13:
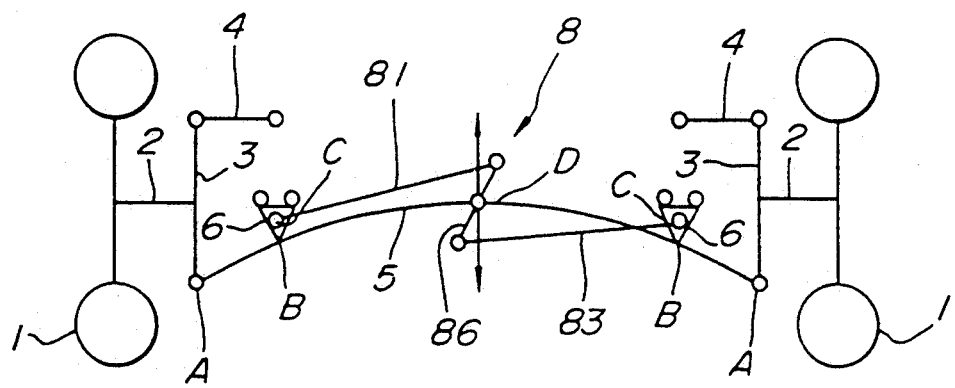
FIG. 13 is a schematic diagram of a suspension system with a transverse leaf spring according to a fourth embodiment of the present invention.

FIG. 13 shows a suspension system according to a fourth embodiment of the present invention.

The suspension system according to the fourth embodiment employs Watt's linkage mechanisms 8 similar to those of the second embodiment. The upper and lower links 81, 83 of each of the Watt's linkage mechanisms 8 are pivotally coupled to the vehicle body at pivot points C that are positioned in the vicinity of the respective supporting points B where the leaf spring 5 is connected to the vehicle body. The ends of the upper and lower links 81, 83 are pivotally coupled to the respective mount members 6 at the supporting points B. Therefore, the mount members 6 are shared by the leaf spring 5 and the upper and lower links 81, 83.

The leaf spring 5 and the Watts' linkage mechanisms 8 can simultaneously be attached to the vehicle body simply by installing the mount members 6 and the links 81, 83, 86 on the leaf spring 5 and then attaching the mount members 6 to the vehicle body. Therefore, the process of attaching the leaf spring 7 and the Watts' linkage mechanisms 8 to the vehicle body is simplified.

In each of the above mechanisms, there are front and rear link mechanisms for allowing the leaf spring to move vertically but limiting any transverse movement of the leaf spring. However, only one of the front and rear link mechanisms may be used as a transverse movement limiting mechanism.

Each of the suspension systems according to the various embodiments of the present invention independently performs a function to limit vertical movement of the leaf spring 5 and a function to limit transverse movement of the leaf spring 5. Since the transverse movement of the leaf spring 5 is limited, the suspension system maintains its transverse rigidity, and since the vertical movement of the leaf spring 5 is limited, the suspension system is allowed to function as a stabilizer for better riding comfort. Inasmuch as any transverse movement of the leaf spring 5 is limited by the link mechanisms, the durability of the suspension system is much higher than would be if the transverse movement of the leaf spring 5 were limited by a guide roller and a guide rail.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

We claim:

1. A suspension system on a motor vehicle having road wheels rotatably supported on a vehicle body, comprising:
   a pair of knuckle members on which the road wheels are rotatably mounted;
   an elongate leaf spring which is vertically resilient and extends transversely with respect to the vehicle body, said leaf spring having opposite ends coupled to the knuckle members, respectively;
   a support member supporting said leaf spring at two supporting points thereon which are spaced from each other transversely with respect to the vehicle body, for allowing said leaf spring to move transversely but limiting said leaf spring against vertical movement with respect to the vehicle body; and
   a transverse movement limiting mechanism for allowing said leaf spring to move vertically but limiting said leaf spring against transverse movement with respect to the vehicle body, said transverse movement limiting mechanism comprising a link mechanism which couples a portion of said leaf spring between said two supporting points to the vehicle body.

2. A suspension system according to claim 1, wherein said link mechanism comprises a lateral link having an end pivotally coupled to said portion of the leaf spring between the two supporting points and an opposite end pivotally coupled to the vehicle body, said lateral link extending transversely with respect to the vehicle body.

3. A suspension system according to claim 2, wherein said opposite end of the lateral link is pivotally coupled to the vehicle body at a pivot point which is positioned near the center of an imaginary circle which is followed by a pivot point where said end of the lateral link is pivotally coupled to said portion of the leaf spring, when said leaf spring moves vertically.

4. A suspension system according to claim 2, wherein said opposite end of the lateral link is pivotally coupled to the vehicle body at a pivot point which is positioned near a straight line interconnecting said supporting points.

5. A suspension system according to claim 2, wherein said opposite end of the lateral link is pivotally coupled to the vehicle body at a pivot point which is positioned near one of said supporting points, said lateral link being pivotally coupled to said support member.

6. A suspension system according to claim 2, wherein said link mechanism comprises a Watt's linkage mechanism which comprises an intermediate link having a substantially central portion pivotally coupled to a substantially central portion of said leaf spring between said supporting points, and a pair of links having ends pivotally coupled to opposite ends, respectively, of said intermediate link and opposite ends pivotally coupled to the vehicle body.

7. A suspension according to claim 6, wherein said opposite ends of said pair of links are pivotally coupled to the vehicle body at pivot points which are positioned near said supporting points, respectively, said pair of links being pivotally coupled to said supporting members, respectively.

8. A suspension system according to claim 3, wherein said opposite end of the lateral link is pivotally coupled to the vehicle body at a pivot point which is positioned near one of said supporting points, said lateral link being pivotally coupled to said support member.

9. A suspension system on a motor vehicle having road wheels rotatably supported on a vehicle body, comprising:
   a pair of knuckle members on which the road wheels are rotatably mounted;
   an elongate leaf spring which is vertically resilient and extends transversely with respect to the vehicle body, said leaf spring having opposite ends coupled to the knuckle members, respectively;
   a support member supporting said leaf spring at two supporting points thereon which are spaced from each other transversely with respect to the vehicle body, for allowing said leaf spring to move transversely but limiting said leaf spring against vertical movement with respect to the vehicle body; and
   a transverse movement limiting mechanism for allowing said leaf spring to move vertically but limiting said leaf spring against transverse movement with respect to the vehicle body, said transverse movement limiting mechanism comprising a link mechanism which couples a portion of said leaf spring between said two supporting points to the vehicle body;
   said link mechanism being pivotally coupled to the vehicle body at a pivot point which is positioned near at least one of the supporting points, said link mechanism and said support member being pivotally coupled to each other.

10. A suspension on a motor vehicle having road wheels rotatably supported on a vehicle body, comprising:
    a pair of knuckle members on which the road wheels are rotatably mounted;

an elongate leaf spring which is vertically resilient and extends transversely with respect to the vehicle body, said leaf spring having opposite ends coupled to the knuckle members, respectively;

support means for supporting said leaf spring at at least two supporting points thereon which are spaced from each other transversely with respect to the vehicle body, for allowing said leaf spring to move transversely but limiting said leaf spring against vertical movement with respect to the vehicle body;

transverse movement limiting means for allowing said leaf spring to move vertically but limiting said leaf spring against transverse movement with respect to the vehicle body; and said transverse movement limiting means being connected between of said leaf spring and said vehicle body.

11. A suspension system according to claim 10, wherein said transverse movement limiting means is connected to a portion of said leaf spring between said two points.

12. A suspension system according to claim 10, including means for commonly joining said support means and said transverse movement limiting means to said vehicle body.

* * * * *

UNITED STATES PATENT AND TRADEMARK OFFICE
CERTIFICATE OF CORRECTION

PATENT NO. : 5,251,930
DATED : October 12, 1993
INVENTOR(S) : Kusaka et al.

It is certified that error appears in the above-indentified patent and that said Letters Patent is hereby corrected as shown below:

Column 4, line 57, after "spring" insert --5--.

Column 5, line 26, delete "it"; after "is" insert --otherwise--.

Column 8, line 24, (claim 7, line 1), after "suspension" insert --system--;
Column 8, line 64, (claim 10, line 1), after "suspension" insert --system--.

Column 10, line 4, (claim 10, line 22), delete "of".

Signed and Sealed this

Fifth Day of April, 1994

Attest:

BRUCE LEHMAN

Attesting Officer     Commissioner of Patents and Trademarks